(12) United States Patent
Hwang et al.

(10) Patent No.: US 9,128,239 B2
(45) Date of Patent: Sep. 8, 2015

(54) OPTICAL DEVICE

(71) Applicants: Sintai Optical (Shenzhen) Co., Ltd., Shenzhen, Guandong Province (TW); Asia Optical International Ltd., Tortola (GB)

(72) Inventors: Duen-Kwei Hwang, Taichung (TW); Tsung-Tse Chen, Taichung (TW); Yong-Chao Yang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/287,414

(22) Filed: May 27, 2014

(65) Prior Publication Data
US 2014/0355132 A1    Dec. 4, 2014

(30) Foreign Application Priority Data

May 30, 2013    (TW) .............................. 102119084 A

(51) Int. Cl.
*G02B 7/02* (2006.01)
*G02B 7/04* (2006.01)
*G02B 7/10* (2006.01)

(52) U.S. Cl.
CPC ... *G02B 7/04* (2013.01); *G02B 7/10* (2013.01)

(58) Field of Classification Search
CPC .................................... G02B 7/04; G02B 7/10
USPC .................................................. 359/826, 827
See application file for complete search history.

(56) References Cited

U.S. PATENT DOCUMENTS 6,046,864 A * 4/2000 Onda ............................ 359/819

* cited by examiner

*Primary Examiner* — William Choi
(74) *Attorney, Agent, or Firm* — McClure, Qualey & Rodack, LLP

(57) ABSTRACT

In an optical device, a first spring connects a first lens frame and a second lens frame for exerting a spring force thereon so that first pins of the first lens frame and second pins of the second lens frame abut a first cam groove and a second cam groove of a cam barrel respectively. A second spring connects the second lens frame and a third lens frame for exerting a spring force thereon so that the second pins of the second lens frame and third pins of the third lens frame abut the second cam groove and a third cam groove of the cam barrel respectively. The first spring may be a compression spring, and the second spring may be an extension spring.

20 Claims, 12 Drawing Sheets

OPTICAL DEVICE

BACKGROUND OF THE INVENTION

1. Field of the Invention

The invention relates to an optical device, and more particularly to an optical device having lens frames positioned by springs.

2. Description of the Related Art

Referring to FIGS. 1 and 2, a conventional optical lens 100 includes a base 10, a first lens frame 20, a second lens frame 30 and a third lens frame 40. An image sensing element (not shown) is disposed on the base 10. The first lens frame 20 bears a first lens group (not shown). The second lens frame 30 bears a second lens group (not shown). The third lens frame 40 bears a third lens group (not shown). The first lens frame 20 has two first pins 22 on an outer periphery thereof. The second lens frame 30 has two second pins 32 on an outer periphery thereof. The third lens frame 40 has two third pins 42. In zoom operation, the first pins 22, the second pins 32 and the third pins 42 are driven by cam grooves on a cam barrel and guided by the guiding grooves on a straight advance barrel to move toward or apart from the image sensing element on the base 10 along an optical axis.

There are gaps existing between the first pins 22, the second pins 32, the third pins 42 and the cam grooves. The gaps may cause inaccurate positioning of the lens frames so as to cause imprecise zooming. To fix the problem, the optical lens 100 further includes a first spring 50, a second spring 60 and a third spring 70. The first spring 50 connects the first lens frame 20 and the base 10 and exerts a spring force on the first lens frame 20. The second spring 60 connects the second lens frame 30 and the base 10 and exerts a spring force on the second lens frame 30. As a result, the first pins 22, the second pins 32 and the third pins 42 are pulled by the first spring 50, the second spring 60 and the third spring 70 that are extension springs to abut the cam grooves 112, 114 and 116 as shown in FIG. 3.

In the described structure, each lens frame is connected to the base by an extension spring. Therefore, three extension springs are included in the optical lens 100, the assembly of which requires much time and labor.

BRIEF SUMMARY OF THE INVENTION

The invention provides an optical device having springs disposed between lens frames, whereby the amount of springs is reduced so as to reduce the time and labor for assembly. The optical device in accordance with an exemplary embodiment of the invention includes a straight advance barrel having an axis and a plurality of guiding grooves parallel to the axis; a cam barrel rotatably disposed around the straight advance barrel and having a first cam groove and a second cam groove; a first lens frame bearing a first lens group and having a plurality of first pins which extend through the guiding grooves and movably engage the first cam groove, wherein when the cam barrel rotates, the first cam groove moves the first pins along the guiding grooves so as to move the first lens frame along the axis; a second lens frame bearing a second lens group and having a plurality of second pins which extend through the guiding grooves and movably engage the second cam groove, wherein when the cam barrel rotates, the second cam groove moves the second pins along the guiding grooves so as to move the second lens frame along the axis; and a first spring connecting the first lens frame and the second lens frame and exerting a first spring force on the first lens frame and the second lens frame so that the first pins and the second pins abut the first cam groove and the second cam groove respectively.

In another exemplary embodiment, the cam barrel further has a third cam groove. The optical device further includes a third lens frame bearing a third lens group and having a plurality of third pins which extend through the guiding grooves and movably engage the third cam groove, wherein when the cam barrel rotates, the third cam groove moves the third pins along the guiding grooves so as to move the third lens frame along the axis; and a second spring connecting the second lens frame and the third lens frame and exerting a second spring force on the second lens frame and the third lens frame so that the second pins and the third pins abut the second cam groove and the third cam groove.

In yet another exemplary embodiment, the first spring is a compression spring, and the second spring is an extension spring.

In another exemplary embodiment, the first spring is disposed between and propped against the first lens frame and the second lens frame, and the second spring is fixed on the outer peripheries of the second lens frame and the third lens frame.

In yet another exemplary embodiment, the first spring is a compression spring, and the second spring is an extension spring.

In another exemplary embodiment, the first spring is fixed to the outer peripheries of the first lens frame and the second lens frame; the second spring is disposed between and propped against the second lens frame and the third lens frame.

In yet another exemplary embodiment, the cam barrel further has a fourth cam groove. The optical device further comprises a fourth lens frame bearing a fourth lens group and having a plurality of fourth pins which extend through the guiding grooves and movably engage the fourth cam groove; and a third spring connecting the third lens frame and the fourth lens frame and exerting a third spring force on the third lens frame and the fourth lens frame so that the third pins and the fourth pins abut the third cam grooves and the fourth cam grooves respectively. When the cam barrel rotates, the fourth cam groove moves the fourth pins along the guiding grooves so as to move the fourth lens frame along the axis.

In another exemplary embodiment, the first spring is a compression spring, the second spring is an extension spring, and the third spring is a compression spring.

In yet another exemplary embodiment, the first spring is disposed between and propped against the first lens frame and the second lens frame, the second spring is fixed on the outer peripheries of the second lens frame and the third lens frame, and the third spring is disposed between and propped against the third lens frame and the fourth lens frame.

In another exemplary embodiment, the first spring is an extension spring, the second spring is a compression spring, and the third spring is an extension spring.

In yet another exemplary embodiment, the first spring is fixed to the outer peripheries of the first lens frame and the second lens frame; the second spring is disposed between and propped against the second lens frame and the third lens frame; the third spring is fixed to the outer peripheries of the third lens frame and the fourth lens frame.

In another exemplary embodiment, the optical device further comprises a base to which the straight advance barrel is connected; an image sensing element disposed on the base, with the axis extending therethrough; and a shutter configured to be disposed on the second lens frame and opened to form an image of light on the image sensing element, wherein the first lens frame is disposed between the second lens frame and the base, and the second lens frame is disposed between the first lens frame and the third lens frame.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A camera lens is taken as an example for introducing an optical device of the invention.

Figure 4:
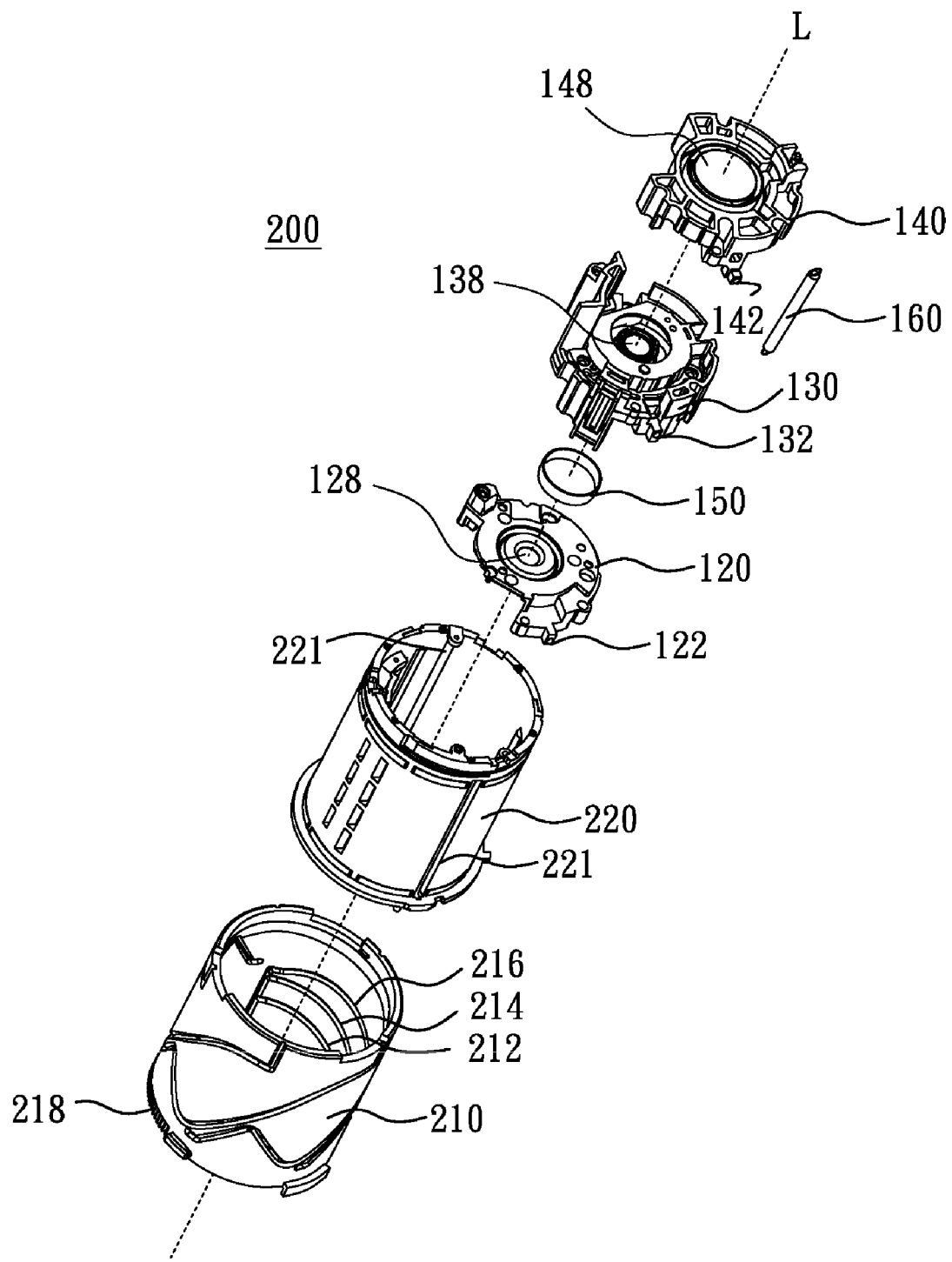
FIG. 4 is a perspective exploded view of an embodiment of an optical lens of the invention.
Figure 5:
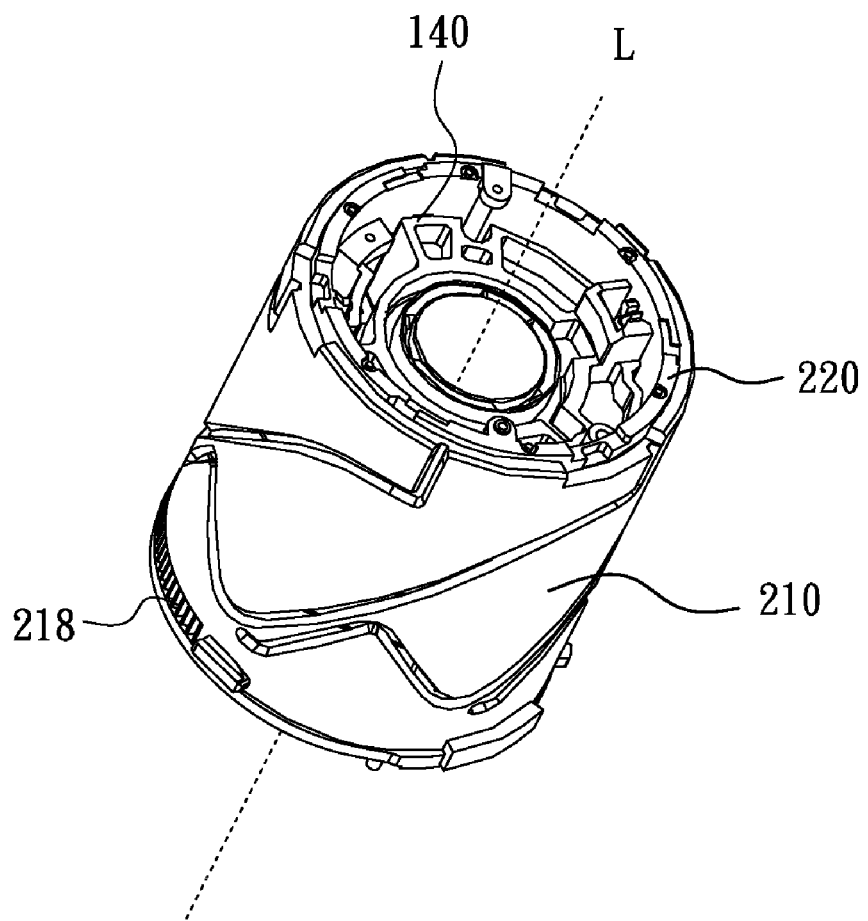
FIG. 5 is a perspective view of an embodiment of an optical lens of the invention.
Figure 6:
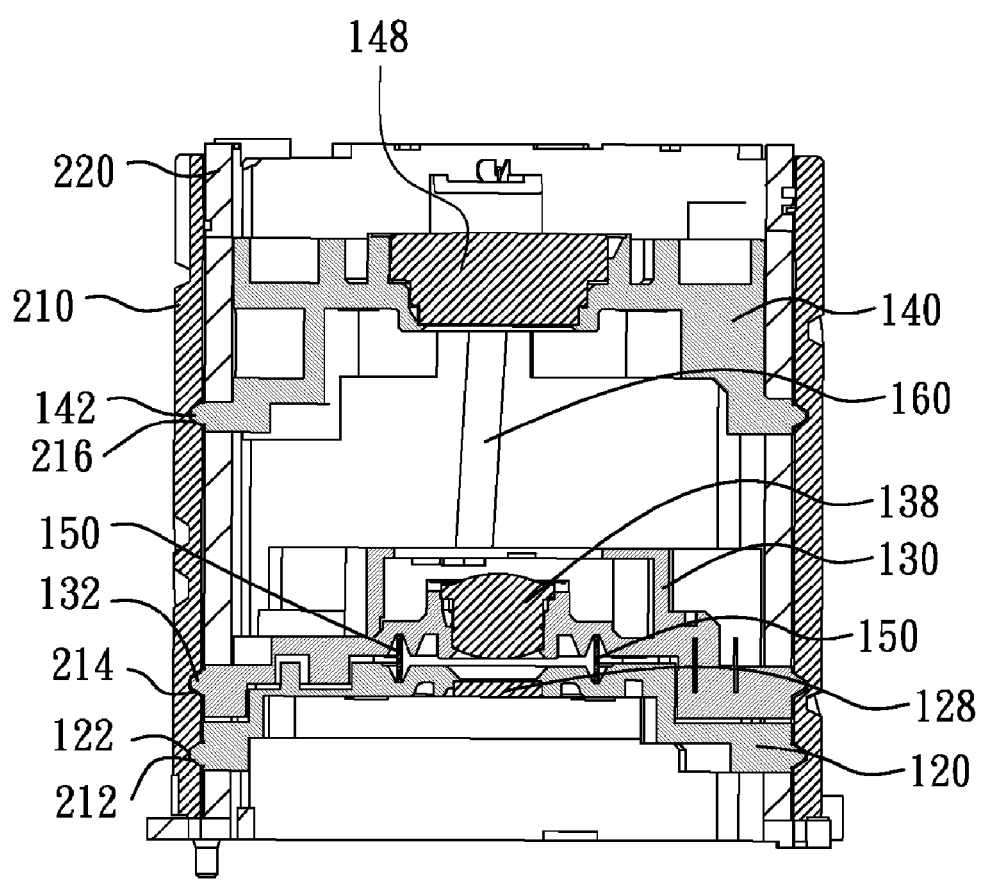
FIG. 6 is a cross section along line A-A of FIG. 5.

Referring to FIGS. 4, 5 and 6, the optical device 200 of the invention includes a base (not shown), a cam barrel 210, a straight advance barrel 220, a first lens frame 120, a second lens frame 130, a third lens frame 140, a first spring 150 and a second spring 160.

An image sensing element, such as CCD, is disposed on the base. The straight advance barrel 220 is a circular barrel and connected to the base. An axis L of the straight advance barrel 220 extends through the image sensing element disposed on the base. Two linear guiding grooves 221 are formed on the straight advance barrel 220 and parallel to the axis L. The cam barrel 210 surrounds the straight advance barrel 220. A first cam groove 212, a second cam groove 214 and a third cam groove 216 are formed on an inner periphery of the cam barrel 210. Teeth 218 are formed on an outer periphery of the cam barrel 210. Teeth 218 engage teeth formed on a shaft of a motor, whereby the motor drives the cam barrel 210 to rotate about the axis L.

The first lens frame 120 bears a first lens group 128 and has two first pins 122 extending through the guiding grooves 221 of the straight advance barrel 220 and movably engaging with the first cam groove 212. The second lens frame 130 bears a second lens group 138 and has two second pins 132 extending through the guiding grooves 221 of the straight advance barrel 220 and movably engaging with the second cam groove 214. The third lens frame 140 bears a third lens group 148 and has two third pins 142 extending through the guiding grooves 221 of the straight advance barrel 220 and movably engaging with the third cam groove 216. When the cam barrel 210 rotates, the first cam groove 212 pushes the first pins 122 to move along the guiding grooves 221 whereby the first lens frame 120 moves toward or away from the image sensing element on the base. Similarly, the second cam groove 214 pushes the second pins 132 to move along the guiding grooves 221 whereby the second lens frame 130 moves toward or away from the image sensing element. The third cam groove 216 pushes the third pins 142 to move along the guiding grooves 221 whereby the third lens frame 140 moves toward or away from the image sensing element. Because the first cam groove 212, the second cam groove 214 and the third cam groove 216 have different curve shape, when the cam barrel 210 rotates, the first lens frame 120, the second lens frame 130 and the third lens frame 140 have relative movement to perform a zoom.

Figure 7:
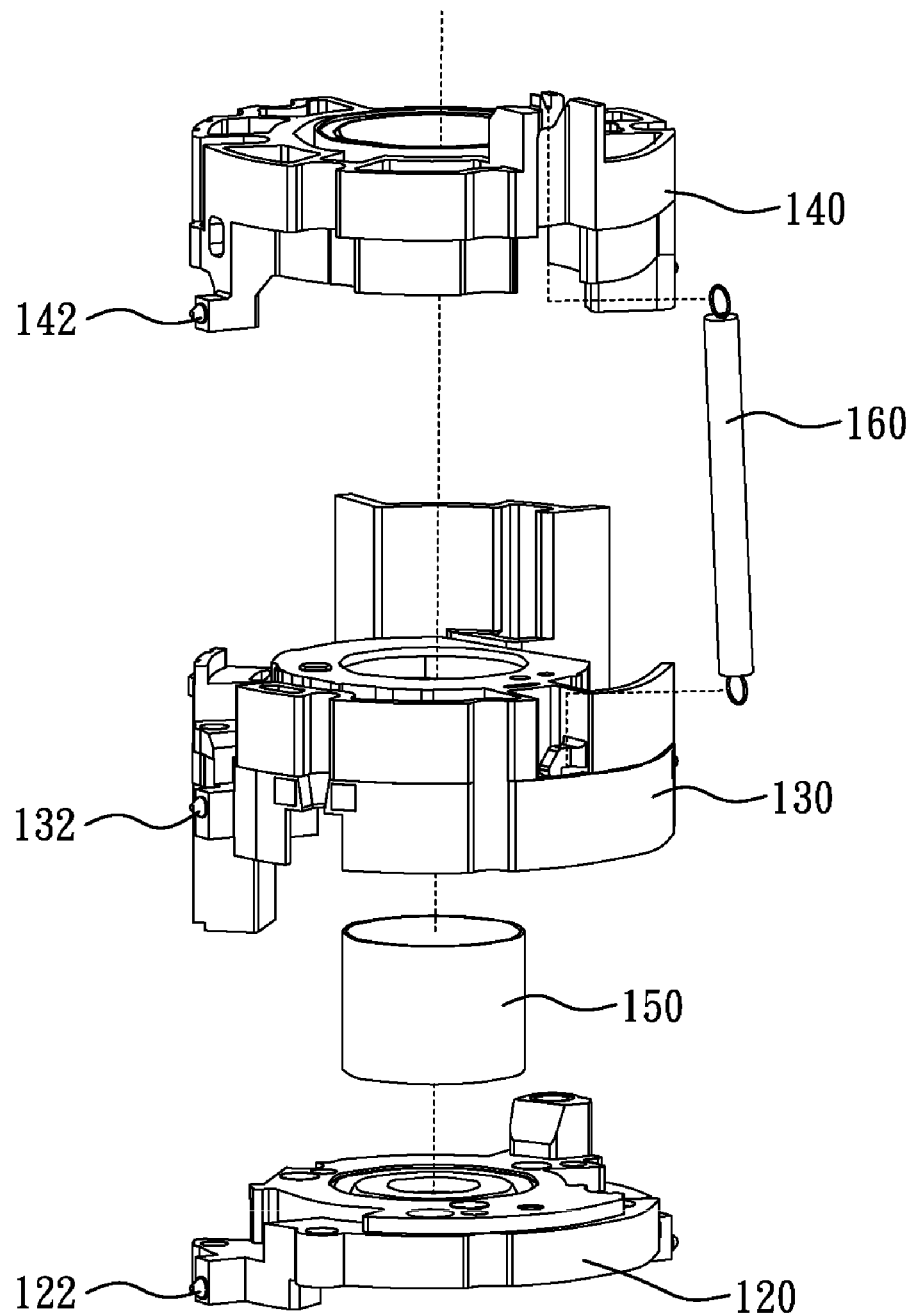
FIG. 7 is a perspective exploded view of lens frames and springs of an optical lens of the invention.
Figure 8:
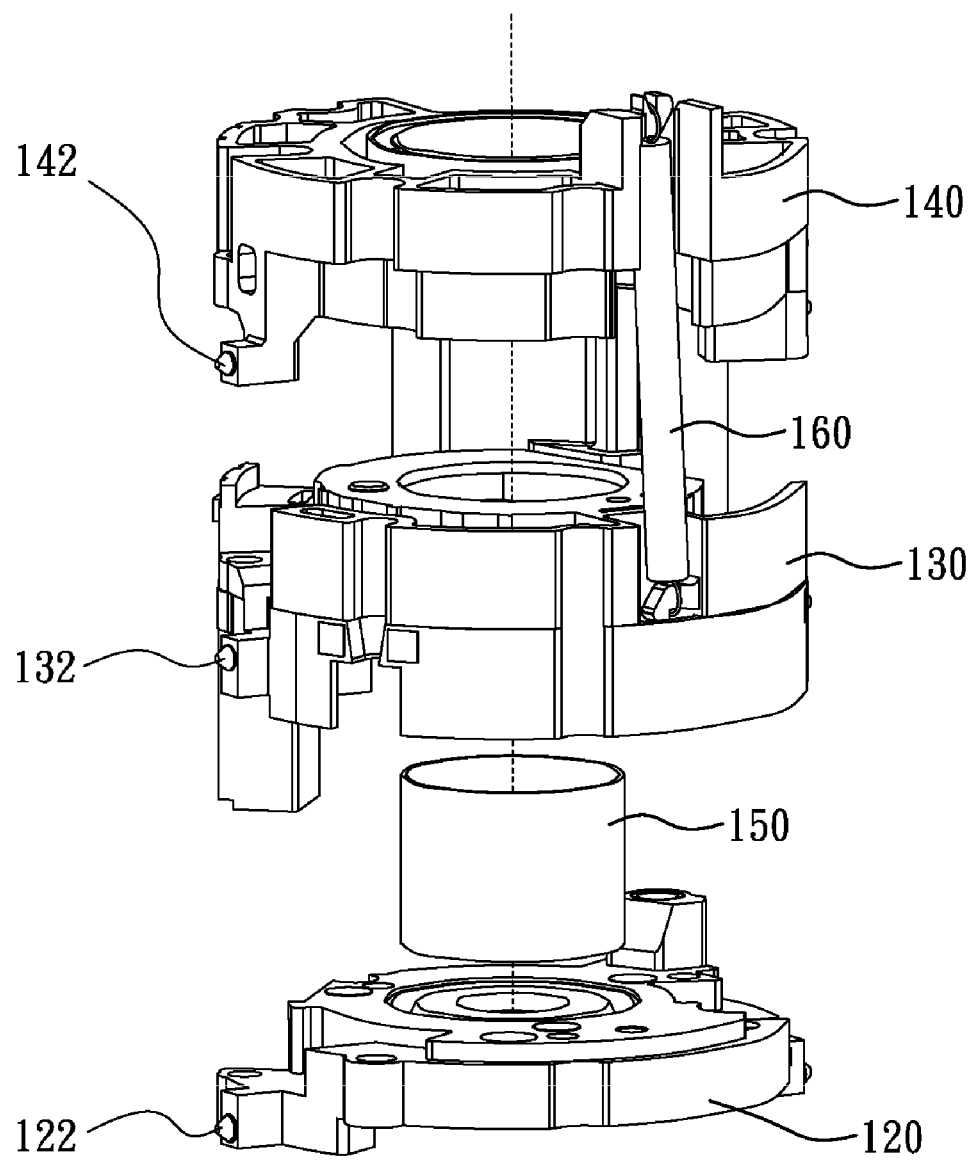
FIG. 8 is a perspective view of lens frames and springs of an optical lens of the invention.
Figure 9:
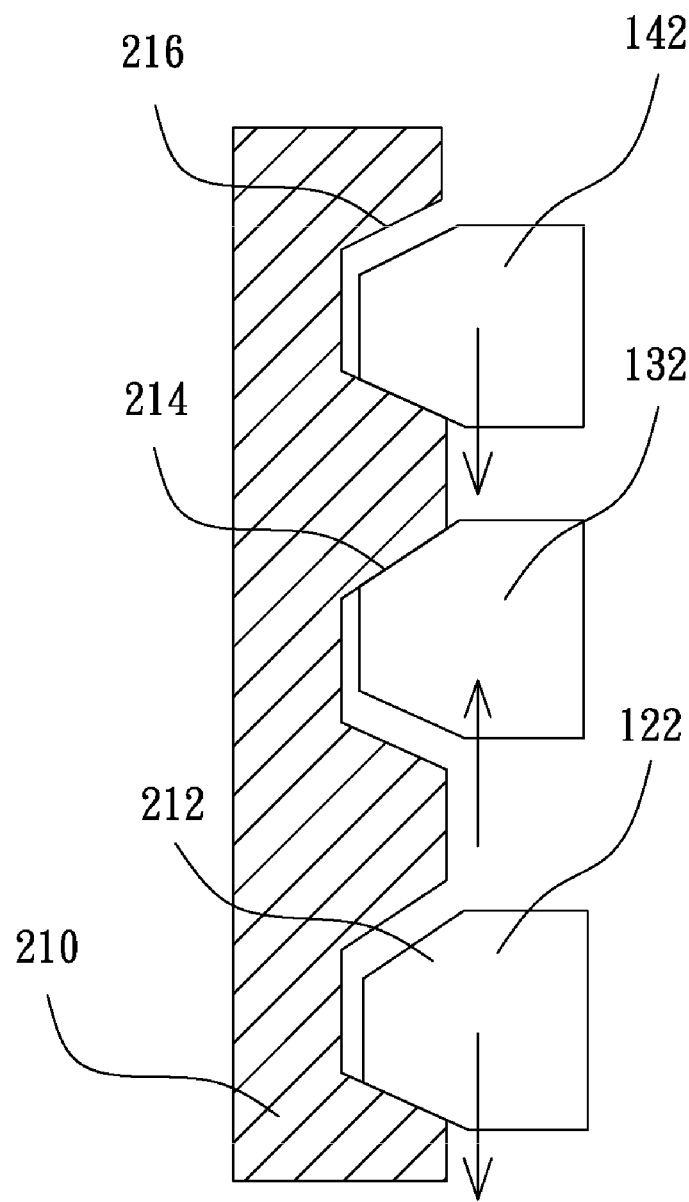
FIG. 9 depicts lens frames abutting a cam barrel of an optical lens of the invention.

There are gaps between the first pins 122 and the first cam grooves 212, between the second pins 132 and the second cam grooves 214, and between the third pins 142 and the third cam grooves 216. To prevent the gaps from affecting the precise positioning of each lens frames, as shown in FIGS. 7, the first spring 150 connects the first lens frame 120 and the second lens frame 130 and exerts force on the first lens frame 120 and the second lens frame 130 whereby the first pins 122 of the first lens frame 120 and the second pins 132 of the second lens frame 130 abut the first cam groove 212 and the second cam groove 214 respectively. As shown in FIG. 8, the second spring 160 connects the second lens frame 130 and the third lens frame 140 and exerts force on the second lens frame 130 and the third lens frame 140 whereby the second pins 132 of the second lens frame 130 and the third pins 142 of the third lens frame 140 abut the second cam groove 214 and the third cam groove 216 respectively. In this embodiment, the first spring 150 is a compression spring disposed between the first lens frame 120 and the second lens frame 130 with two ends of the first spring 150 being propped against the first lens frame 120 and the second lens frame 130. Thus, the first spring 150 exerts a thrust on the first lens frame 120 and the second lens frame 130 respectively so that the first pins 122 abut a lower rim of the first cam groove 212 and the second pins 132 abut an upper rim of the second cam groove 214. The second spring 160 is an extension spring with two ends being fixed to outer periphery of the second lens frame 130 and the third lens frame 140. Thus, the second spring 160 exerts a pulling force on the second lens frame 130 and the third lens frame 140 so that the second pins 132 abuts an upper rim of the second cam groove 214 and the third pins 142 abuts a lower rim of the third cam groove 216, as shown in FIG. 9.

Since springs are disposed between the first lens frame 120, the second lens frame 130 and the lens frame 140, fewer springs are included in this embodiment than in the prior art. Thus, the assembly of the optical device of the invention requires less time and labor.

Figure 1:
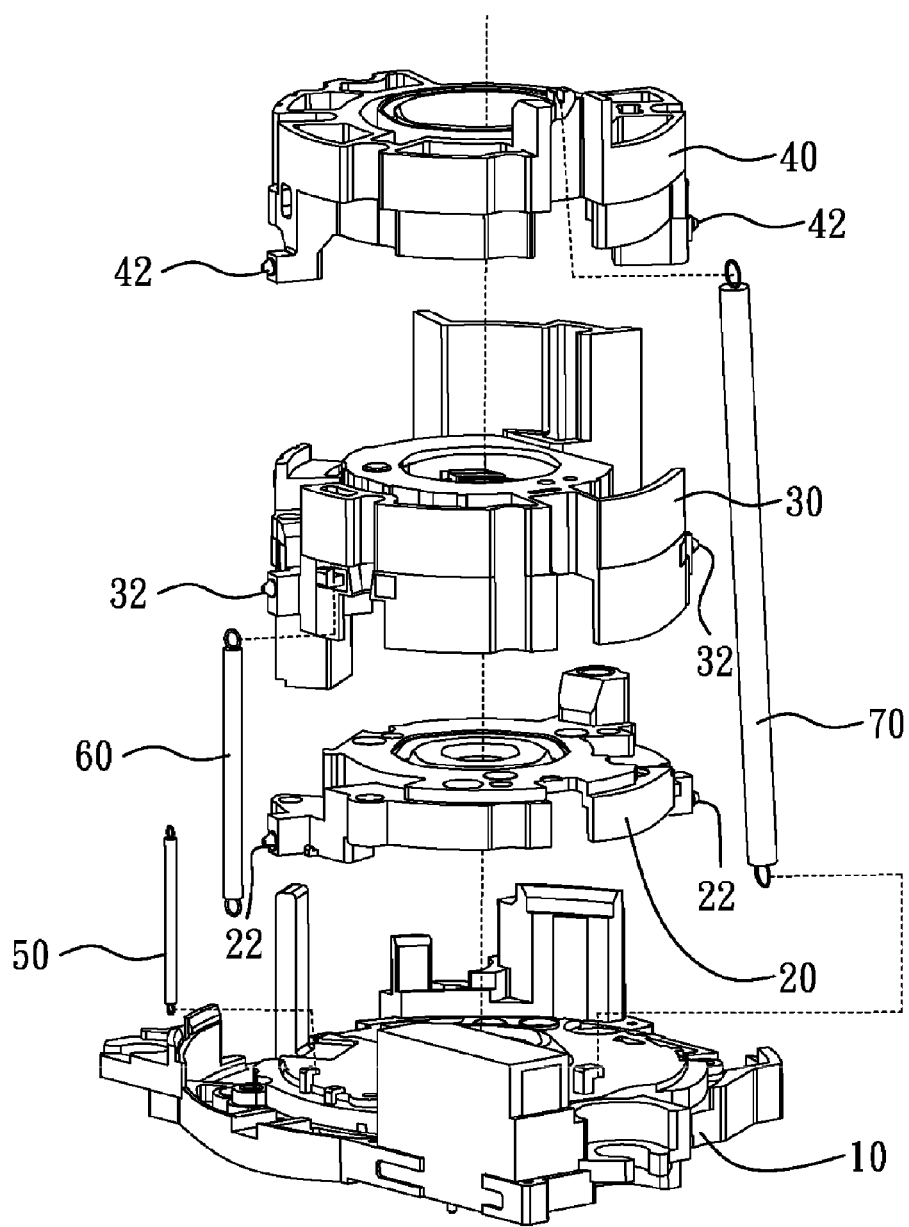
FIG. 1 is a perspective exploded view of a conventional optical lens.
Figure 2:
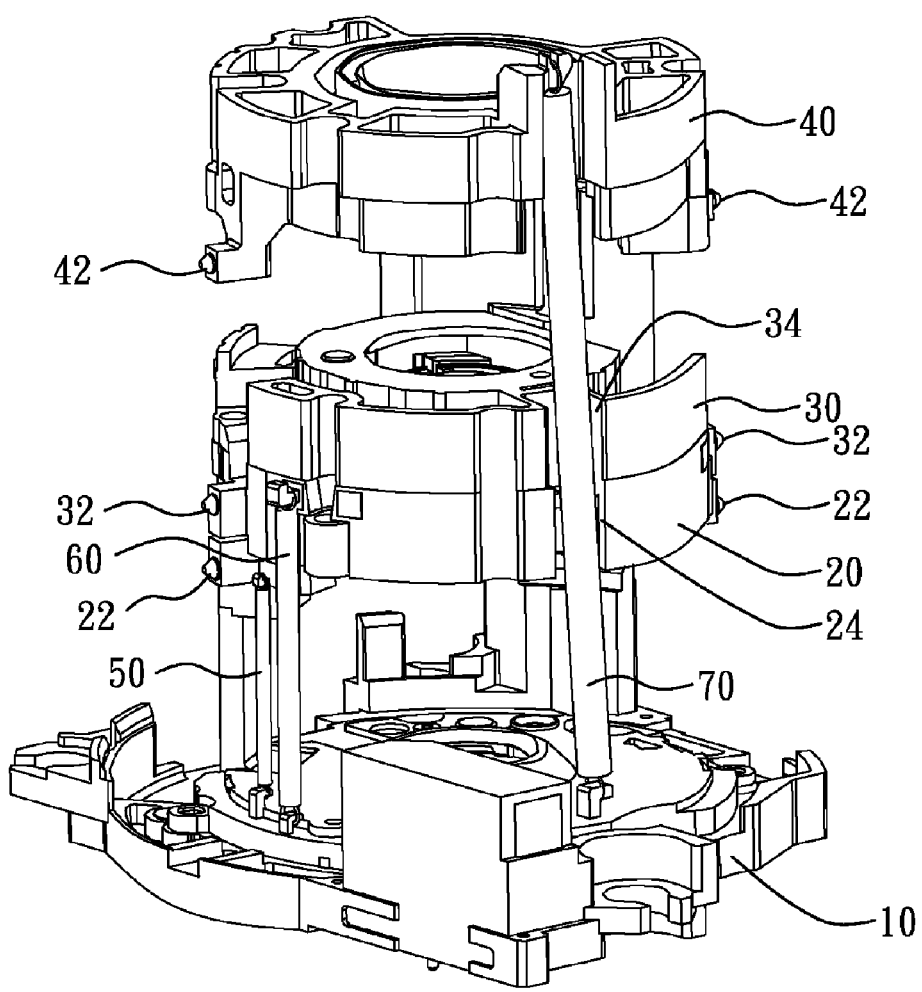
FIG. 2 is a perspective view of a conventional optical lens.
Figure 3:
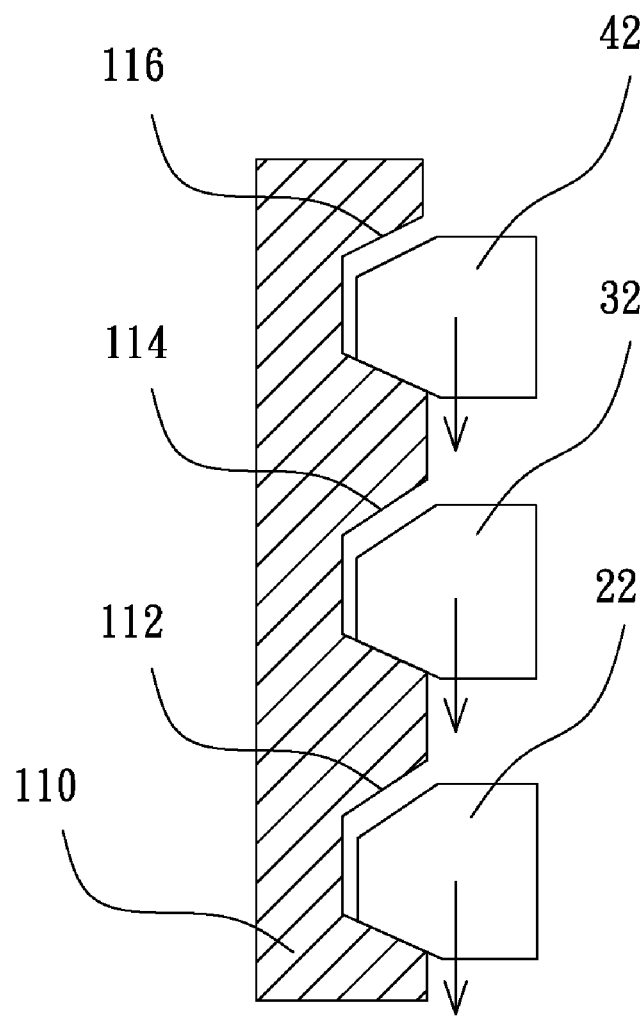
FIG. 3 depicts lens frames abutting a cam barrel of a conventional optical lens.

Some optical lenses have distinct structure wherein a shutter (not shown) is disposed on the second lens frame 130. When the shutter is open, light passes through all the lenses to form images on the image sensing element. Referring to FIG. 2, the prior art provides through holes on the first lens frame 20 and the second lens frame 30, allowing the third spring 70 to extend through. To avoid light leakage, tape is used for sealing the through hole that significantly requires labor. In this embodiment of the invention, the second spring 160 is an extension spring with two ends being fixed to the second lens frame 130 and the third lens frame 140. As the spring 160 is not fixed to the base, no through holes are provided on the second lens frame 130. As a result, no light leakage occurs, no tape is needed, and time and labor of assembly of the optical lens are reduced.

Figure 10:
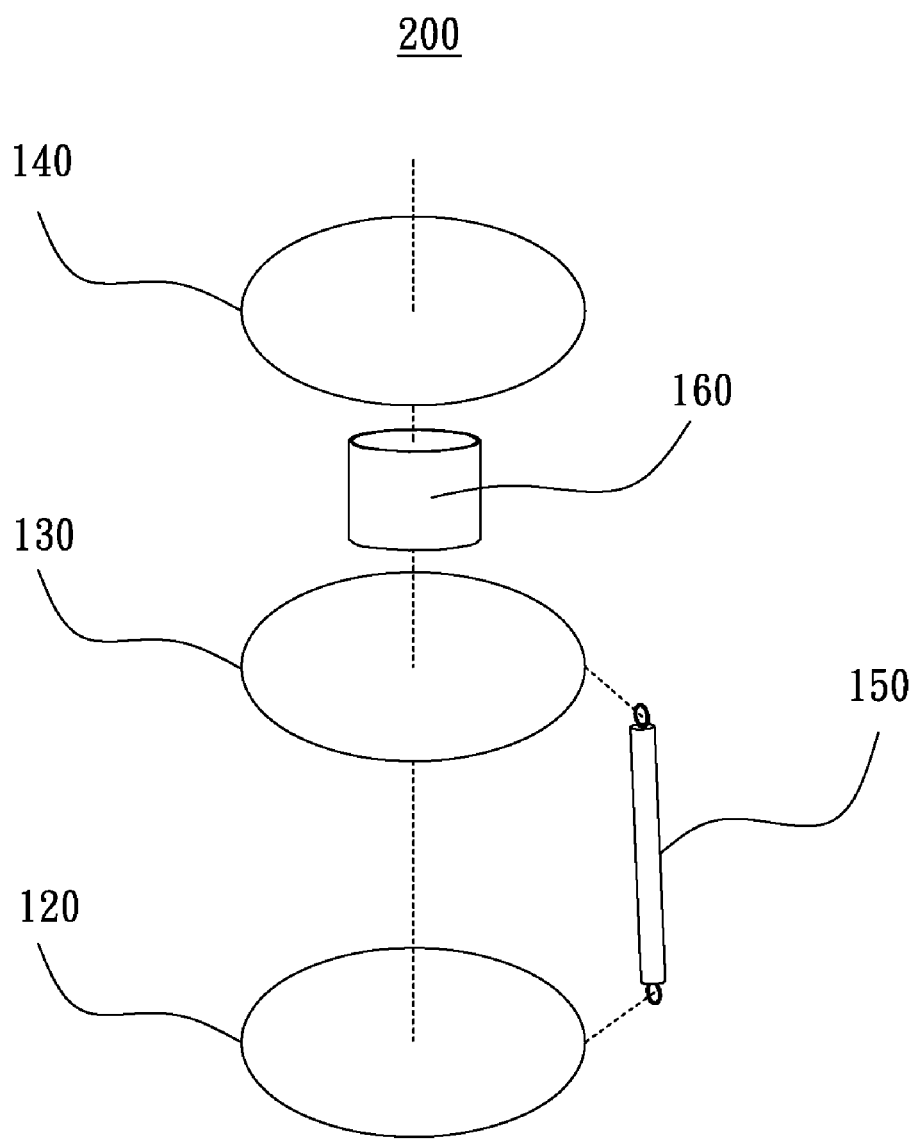
FIG. 10 is a perspective exploded view of another embodiment of an optical lens of the invention.

Referring to FIG. 10, another embodiment of the optical device of the invention is shown. In this embodiment, the first spring 150 is an extension spring, and the second spring 160 is a compression spring.

Figure 11:
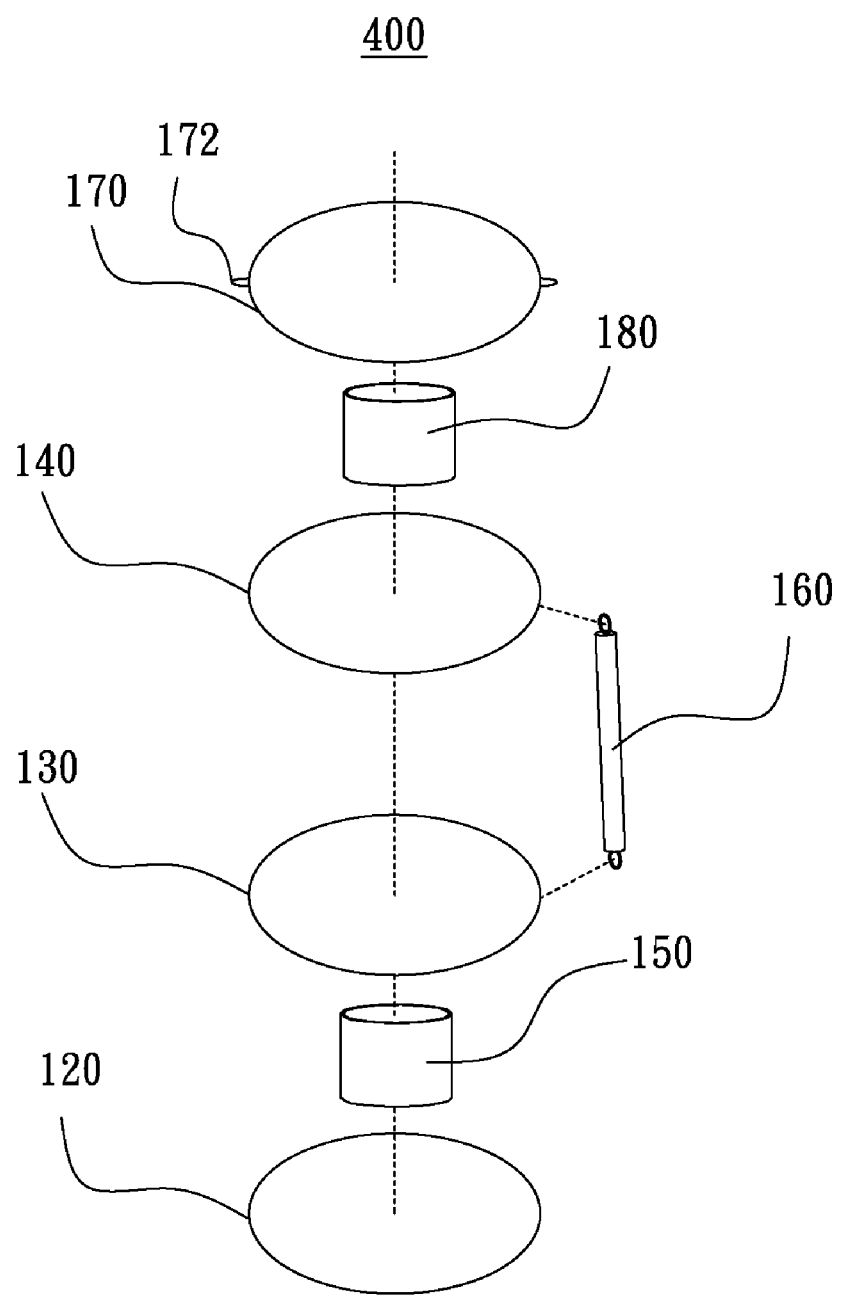
FIG. 11 is a perspective exploded view of another embodiment of another optical lens of the invention.

Referring to FIG. 11, another embodiment of the optical device of the invention is shown. In this embodiment, an optical device 400 of the invention includes the first lens frame 120, the second lens frame 130, the third lens frame 140 and a fourth lens frame 170 bearing a fourth lens group (not shown). The fourth lens frame 170 has two fourth pins 172 movably engaging the fourth cam groove (not shown) of the cam barrel 210. The optical device 400 further includes a third spring 180 connecting the third lens frame 140 and the fourth lens frame 170 and exerting spring force on the third lens frame 140 and the fourth lens frame 170, whereby the third pins 142 and the fourth pins abut the third cam groove 216 and the fourth cam groove. In this embodiment, as the third spring 180 is a compression spring, the third pins 142 abut a lower rim of the third cam groove 216 and the fourth pins 172 abut an upper rim of the fourth cam groove.

Figure 12:
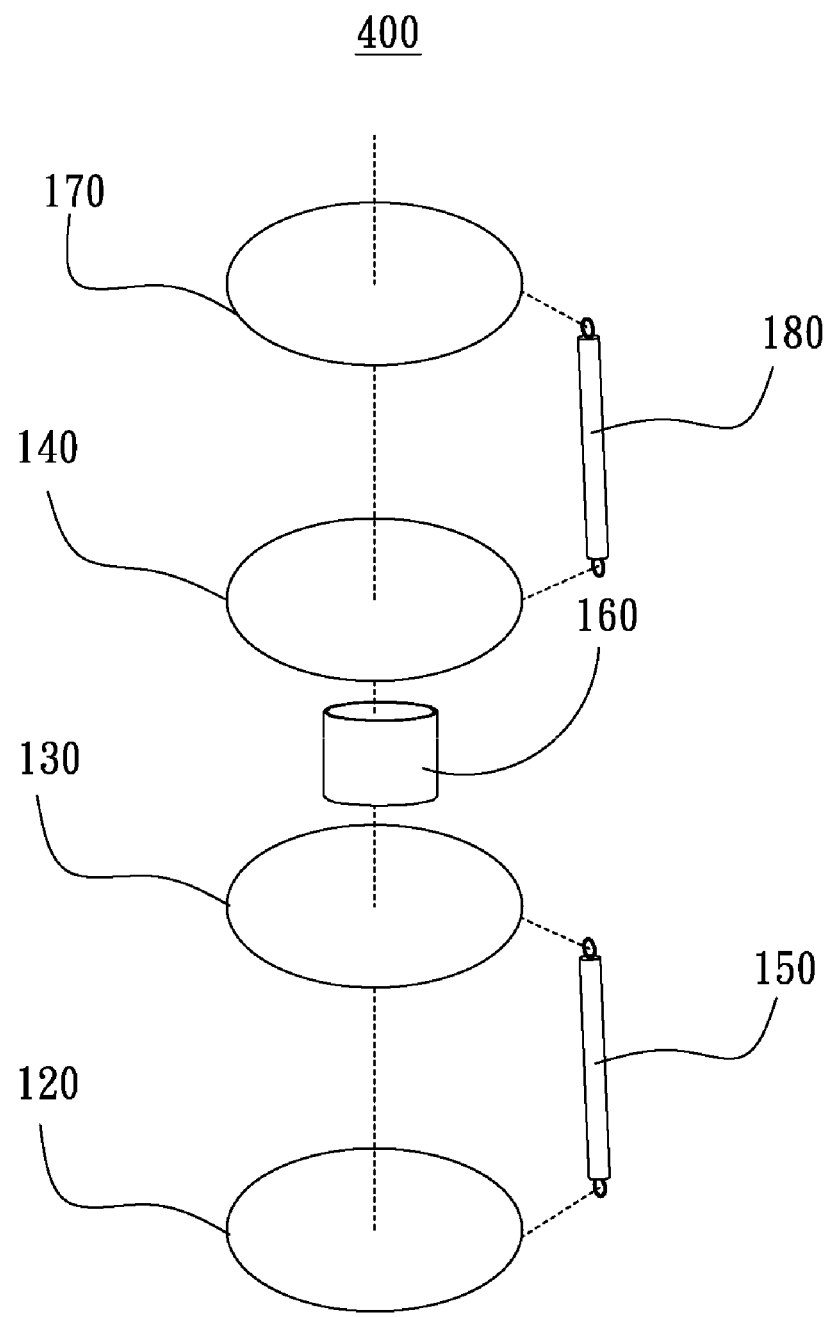
FIG. 12 is a perspective exploded view of another embodiment of another optical lens of the invention.

Referring to FIG. 12, another embodiment of an optical device of the invention is shown. In this embodiment, the first spring 150 is an extension spring, the second spring 160 is a compression spring, and the third spring 180 is an extension spring.

In conclusion, since springs are disposed between the first lens frame 120, the second lens frame 130 and the lens frame 140, fewer springs are included in the invention than in the prior art. Thus, the assembly of the optical device of the invention requires less time and labor.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
   a straight advance barrel having an axis and a plurality of guiding grooves parallel to the axis;
   a cam barrel rotatably disposed around the straight advance barrel and having a first cam groove and a second cam groove;
   a first lens frame bearing a first lens group and having a plurality of first pins which extend through the guiding grooves and movably engage the first cam groove, wherein when the cam barrel rotates, the first cam groove moves the first pins along the guiding grooves so as to move the first lens frame along the axis;
   a second lens frame bearing a second lens group and having a plurality of second pins which extend through the guiding grooves and movably engage the second cam groove, wherein when the cam barrel rotates, the second cam groove moves the second pins along the guiding grooves so as to move the second lens frame along the axis; and
   a first spring connecting the first lens frame and the second lens frame and exerting a first spring force on the first lens frame and the second lens frame so that the first pins and the second pins abut the first cam groove and the second cam groove respectively.

2. The optical device as claimed in claim 1, wherein the cam barrel further has a third cam groove, and the optical device further comprises:
   a third lens frame bearing a third lens group and having a plurality of third pins which extend through the guiding grooves and movably engage the third cam groove, wherein when the cam barrel rotates, the third cam groove moves the third pins along the guiding grooves so as to move the third lens frame along the axis; and
   a second spring connecting the second lens frame and the third lens frame and exerting a second spring force on the second lens frame and the third lens frame so that the second pins and the third pins abut the second cam groove and the third cam groove.

3. The optical device as claimed in claim 2, wherein the first spring is a compression spring, and the second spring is an extension spring.

4. The optical device as claimed in claim 3, wherein the first spring is disposed between and propped against the first lens frame and the second lens frame, and the second spring is fixed on outer peripheries of the second lens frame and the third lens frame.

5. The optical device as claimed in claim 4 further comprising:
   a base to which the straight advance barrel is connected;
   an image sensing element disposed on the base, with the axis extending therethrough; and
   a shutter disposed on the second lens frame and configured to be opened to form an image of light on the image sensing element, wherein the first lens frame is disposed between the second lens frame and the base, and the second lens frame is disposed between the first lens frame and the third lens frame.

6. The optical device as claimed in claim 3 further comprising:
   a base to which the straight advance barrel is connected;
   an image sensing element disposed on the base, with the axis extending therethrough; and
   a shutter disposed on the second lens frame and configured to be opened to form an image of light on the image sensing element, wherein the first lens frame is disposed between the second lens frame and the base, and the second lens frame is disposed between the first lens frame and the third lens frame.

7. The optical device as claimed in claim 2, wherein the first spring is a compression spring, and the second spring is an extension spring.

8. The optical device as claimed in claim 7, wherein the first spring is fixed to outer peripheries of the first lens frame and the second lens frame; the second spring is disposed between and propped against the second lens frame and the third lens frame.

9. The optical device as claimed in claim 8 further comprising:
   a base to which the straight advance barrel is connected;
   an image sensing element disposed on the base, with the axis extending therethrough; and
   a shutter disposed on the second lens frame and configured to be opened to form an image of light on the image sensing element, wherein the first lens frame is disposed between the second lens frame and the base, and the second lens frame is disposed between the first lens frame and the third lens frame.

10. The optical device as claimed in claim 7 further comprising:
- a base to which the straight advance barrel is connected;
- an image sensing element disposed on the base, with the axis extending therethrough; and
- a shutter disposed on the second lens frame and configured to be opened to form an image of light on the image sensing element, wherein the first lens frame is disposed between the second lens frame and the base, and the second lens frame is disposed between the first lens frame and the third lens frame.

11. The optical device as claimed in claim 2, wherein the cam barrel further has a fourth cam groove, and the optical device further comprises:
- a fourth lens frame bearing a fourth lens group and having a plurality of fourth pins which extend through the guiding grooves and movably engage the fourth cam groove, wherein when the cam barrel rotates, the fourth cam groove moves the fourth pins along the guiding grooves so as to move the fourth lens frame along the axis; and
- a third spring connecting the third lens frame and the fourth lens frame and exerting a third spring force on the third lens frame and the fourth lens frame so that the third pins and the fourth pins abut the third cam grooves and the fourth cam grooves respectively.

12. The optical device as claimed in claim 11, wherein the first spring is a compression spring, the second spring is an extension spring and the third spring is a compression spring.

13. The optical device as claimed in claim 12, wherein the first spring is disposed between and propped against the first lens frame and the second lens frame, the second spring is fixed on outer peripheries of the second lens frame and the third lens frame, and the third spring is disposed between and propped against the third lens frame and the fourth lens frame.

14. The optical device as claimed in claim 13 further comprising:
- a base to which the straight advance barrel is connected;
- an image sensing element disposed on the base, with the axis extending therethrough; and
- a shutter disposed on the second lens frame and configured to be opened to form an image of light on the image sensing element, wherein the first lens frame is disposed between the second lens frame and the base, and the second lens frame is disposed between the first lens frame and the third lens frame.

15. The optical device as claimed in claim 12 further comprising:
- a base to which the straight advance barrel is connected;
- an image sensing element disposed on the base, with the axis extending therethrough; and
- a shutter disposed on the second lens frame and configured to be opened to form an image of light on the image sensing element, wherein the first lens frame is disposed between the second lens frame and the base, and the second lens frame is disposed between the first lens frame and the third lens frame.

16. The optical device as claimed in claim 11, wherein the first spring is an extension spring, the second spring is a compression spring and the third spring is an extension spring.

17. The optical device as claimed in claim 16, wherein the first spring is fixed to outer peripheries of the first lens frame and the second lens frame; the second spring is disposed between and propped against the second lens frame and the third lens frame; the third spring is fixed to an outer periphery of the third lens frame and the fourth lens frame.

18. The optical device as claimed in claim 16 further comprising:
- a base to which the straight advance barrel is connected;
- an image sensing element disposed on the base, with the axis extending therethrough; and
- a shutter disposed on the second lens frame and configured to be opened to form an image of light on the image sensing element, wherein the first lens frame is disposed between the second lens frame and the base, and the second lens frame is disposed between the first lens frame and the third lens frame.

19. The optical device as claimed in claim 11 further comprising:
- a base to which the straight advance barrel is connected;
- an image sensing element disposed on the base, with the axis extending therethrough; and
- a shutter disposed on the second lens frame and configured to be opened to form an image of light on the image sensing element, wherein the first lens frame is disposed between the second lens frame and the base, and the second lens frame is disposed between the first lens frame and the third lens frame.

20. The optical device as claimed in claim 2 further comprising:
- a base to which the straight advance barrel is connected;
- an image sensing element disposed on the base, with the axis extending therethrough; and
- a shutter disposed on the second lens frame and configured to be opened to form an image of light on the image sensing element, wherein the first lens frame is disposed between the second lens frame and the base, and the second lens frame is disposed between the first lens frame and the third lens frame.

* * * * *